(12) United States Patent
Emaru et al.

(10) Patent No.: US 7,836,062 B2
(45) Date of Patent: Nov. 16, 2010

(54) PERFORMANCE MONITORING METHOD IN A DISTRIBUTED PROCESSING SYSTEM

(75) Inventors: Hironori Emaru, Yokohama (JP); Masaharu Akatsu, Machida (JP); Norifumi Nishikawa, Machida (JP); Tetsuo Tanaka, Sagamihara (JP); Akihiro Yoshikawa, Kawasaki (JP); Shunsuke Akifuji, Wako (JP); Gou Kojima, Yamato (JP)

(73) Assignee: Hitachi, Ltd., Tokyo (JP)

( * ) Notice: Subject to any disclaimer, the term of this patent is extended or adjusted under 35 U.S.C. 154(b) by 347 days.

(21) Appl. No.: 10/926,014

(22) Filed: Aug. 26, 2004

(65) Prior Publication Data
US 2005/0021547 A1    Jan. 27, 2005

Related U.S. Application Data

(63) Continuation of application No. 09/565,071, filed on May 5, 2000, now Pat. No. 6,807,575.

(30) Foreign Application Priority Data
May 6, 1999    (JP) .................................. 11-125401

(51) Int. Cl.
*G06F 7/00* (2006.01)
(52) U.S. Cl. ..................................... 707/752
(58) Field of Classification Search ............... 707/10, 707/104.1, 100, 3, 752; 709/201, 202, 203, 709/2
See application file for complete search history.

(56) References Cited

U.S. PATENT DOCUMENTS

| | | | | |
|---|---|---|---|---|
| 4,053,871 A | * | 10/1977 | Vidalin et al. | 340/146.2 |
| 5,459,862 A | * | 10/1995 | Garliepp et al. | 1/1 |
| 5,515,488 A | * | 5/1996 | Hoppe et al. | 345/440 |
| 5,664,182 A | * | 9/1997 | Nierenberg et al. | 1/1 |
| 5,737,726 A | * | 4/1998 | Cameron et al. | 705/7 |
| 5,884,035 A | * | 3/1999 | Butman et al. | 709/218 |
| 5,931,919 A | * | 8/1999 | Thomas et al. | 719/315 |
| 5,958,009 A | * | 9/1999 | Friedrich et al. | 709/224 |
| 6,049,803 A | * | 4/2000 | Szalwinski | 1/1 |
| 6,311,206 B1 | * | 10/2001 | Malkin et al. | 709/202 |
| 6,345,383 B1 | * | 2/2002 | Ueki | 717/124 |
| 6,356,893 B1 | * | 3/2002 | Itakura et al. | 1/1 |

(Continued)

FOREIGN PATENT DOCUMENTS

JP    01-181132    7/1989

(Continued)

OTHER PUBLICATIONS

Nikkei, Nov. 8, 1998, No. 184, pp. 192-193.

*Primary Examiner*—Eliyah S Harper
(74) *Attorney, Agent, or Firm*—Mattingly & Malur, P.C.

(57) ABSTRACT

The present invention provides a performance monitoring method of a processing flow that, in a distributed object system, a processing is completed after going by way of processing of several objects through objects. A collector collects, as performance data, a receiving time of a message from the other object and a sending time of a message to the other for an object that becomes a measurement target on each computer. A manager puts received performance data together and calculates and displays a processing time of each object that constitutes a processing flow and a communication time between objects.

4 Claims, 14 Drawing Sheets

| object ID | receive object ID | receive message ID | receive time | send object ID | send message ID | send time |
|---|---|---|---|---|---|---|
| 20001 | 20003 | 1534 | 72000 | 20005 | 2359 | 72500 |

U.S. PATENT DOCUMENTS

| | | | |
|---|---|---|---|
| 6,418,445 B1 * | 7/2002 | Moerbeek | 707/103 X |
| 6,446,113 B1 * | 9/2002 | Ozzie et al. | 709/204 |
| 6,460,025 B1 * | 10/2002 | Fohn et al. | 706/45 |
| 6,584,504 B1 | 6/2003 | Choe | |
| 6,629,097 B1 * | 9/2003 | Keith | 1/1 |
| 6,931,430 B1 * | 8/2005 | Lynch | 709/205 |
| 2002/0002569 A1 * | 1/2002 | Nguyen et al. | 707/515 |

FOREIGN PATENT DOCUMENTS

| | | |
|---|---|---|
| JP | 01-276345 | 11/1989 |
| JP | 04-153743 | 5/1992 |
| JP | 05-274185 | 10/1993 |
| JP | 07-271636 | 10/1995 |
| JP | 07-295864 | 11/1995 |
| JP | 08-137713 | 5/1996 |

\* cited by examiner

| object ID | receive object ID | receive message ID | receive time | send object ID | send message ID | send time |
|---|---|---|---|---|---|---|
| 20001 | 20003 | 1534 | 72000 | 20005 | 2359 | 72500 |

| object ID | receive object ID | receive message ID | receive time | send object ID | send message ID | send time |
|---|---|---|---|---|---|---|
| 20001 | 20008 | 6000 | 50000 | 20004 | 12000 | 50070 |
| 20004 | 20001 | 12000 | 50095 | 20005 | 24000 | 50350 |
| 20005 | 20004 | 24000 | 500405 | 20010 | 36000 | 51685 |

| object ID | receive time | send time |
|---|---|---|
| 20003 | 7205 | 7305 |

FIG.11

| object ID | receive time | send time |
|---|---|---|
| 20003 | 95 | 105 |
| 20001 | 125 | 310 |
| 20002 | 315 | 420 |
| 20008 | 445 | 610 |
| 20005 | 685 | 735 |

FIG.15

| object ID | process time | wait time |
|---|---|---|
| 20001 | 20 | 200 |
| 20002 | 100 | 500 |
| 20003 | 50 | 200 |
| 20004 | 60 | 300 |
| 20005 | 10 | 600 |
| 20006 | 80 | 800 |

1610

FIG.16 target computer: computer 101

| process target | process time |
|---|---|
| object 20001 | 10 |
| object 20002 | 20 |
| idle | 100 |
| object 20002 | 10 |
| idle | 20 |
| object 20001 | 15 |

| Calling (2010) | Called (2020) | Calling times (2030) |
|---|---|---|
| 20001 | 20003 | 3 |
| 20003 | 20002 | 3 |
| 20001 | 20004 | 6 |
| 20004 | 20002 | 5 |
| 20001 | 20005 | 1 |

2001

PERFORMANCE MONITORING METHOD IN A DISTRIBUTED PROCESSING SYSTEM

CROSS-REFERENCES

This is a continuation application of U.S. Ser. No. 09/565,071, filed May 5, 2000 (now U.S. Pat. No. 6,807,575).

BACKGROUND OF THE INVENTION

The present invention is concerned with a distributed processing system in which several objects are distributed and arranged on several computers and relates to the performance monitoring method especially.

There is an equipment that measures the operation status of the computer system as a time series data for each of processes as shown in, for example, Japanese patent Laid-open 7-295864, as an equipment that measures the operation status of several processes in connection with a case that several processes execute a process on a computer cooperatively.

As an example of manufacturing the equipment, as shown in NIKKEI byte exception extra number, 1998.11-8, No. 184, pp 192-193, it is known that Visual. Quantify, etc. of Rational Software company which is a profiler that analyzes a bottleneck of the performance of the application program that is executed on a computer with a module level, a function level and a source level.

On the other hand, a method for executing performance measurement without conscious of a remote procedure call is known, in case that several processes mutually cooperate a process in the distributed processing system that consists of several computers. For example, in Japanese patent Laid-open No. 5-274185, by having a means for detecting issue of a remote procedure call, a means for detecting end of a remote procedure call, and a central performance measurement control means, the mechanism that does association of a process has been realized. This method does association of a calling side with a called side by notifying all of remote procedure call to a central performance measurement control unit.

It is expected that, in the future, a distribution of processing over several computers is advanced and a distributed object system having several computers and a communication function between objects each of which is a program that is distributed and arranged and is executed on these several computers widely spreads.

By using a technique disclosed to the Japanese patent Laid-open No. 7-295864, it is possible to detect a bottleneck of performance in a computer. But, it is difficult to detect the bottleneck of the performance of a distributed object system because there is not association of performance data collected in each computer by only applying this technique to each computer of a distributed object system.

And, it is possible to associate the a send object and a receive object in communication between individual objects in the distributed object system by using a technique disclosed in the Japanese patent Laid-open No. 5-274185. But in case after going by way of processing of several objects through communication between objects, a process is completed, it is difficult to pursue a flow of this series of processing because there is not a means for associating related communication between objects.

In the prior art, while the performance data of a point like each computer and each object can be collected, there is a problem that the performance monitoring for the whole distributed object system cannot be made.

SUMMARY OF THE INVENTION

The present invention is provided on the basis of fore mentioned reason, and object of the present invention is to provide a method of the performance monitoring for the whole distributed processing system and a distributed processing system executing the method.

And, object of the present invention is to provide a method of the performance monitoring of the distributed processing system that can narrow down the bottleneck of performance.

A method for monitoring performance of distributed processing system in the present invention is to collect as performance data at least one of message receiving time from other program entity and message sending time to other program entity for program entity that is measurement target by monitoring means arranged in each of computers, to put the performance data collected by each monitoring means together and calculate processing time of each program entities consisting of a process flow, and to display the results on a display device.

And, a method for monitoring performance of distributed processing system in the present invention is (a) to measure processing time of each object consisting of a process flow, (b) to measure latency that after each object issues a request to other object until gets the result, for object group executed by a computer in which the relevant object is arranged, when processing time measured in the step (a) exceeds predetermined threshold of processing time of the relevant object, and (c) to execute the step (a) for processing flow having a process of the relevant object as the head, when processing time measured in the step (b) exceeds predetermined threshold of processing time of the relevant object.

BRIEF DESCRIPTION OF THE DRAWINGS

FIG. 10 is a diagram showing data structure of collected data list 1101 of the second embodiment form.

FIG. 11 is a diagram showing data structure of request flow table 1201 of the second embodiment form.

FIG. 15 is a diagram showing data structure of threshold table 1610 of the third embodiment form.

FIG. 16 is a diagram showing an example of the point data collection result display screen of the third embodiment form.

DESCRIPTION OF THE PREFERRED EMBODIMENT

An embodiment form of the present invention is in detail explained by using drawings below.

(1) First Embodiment Form

Figure 1:
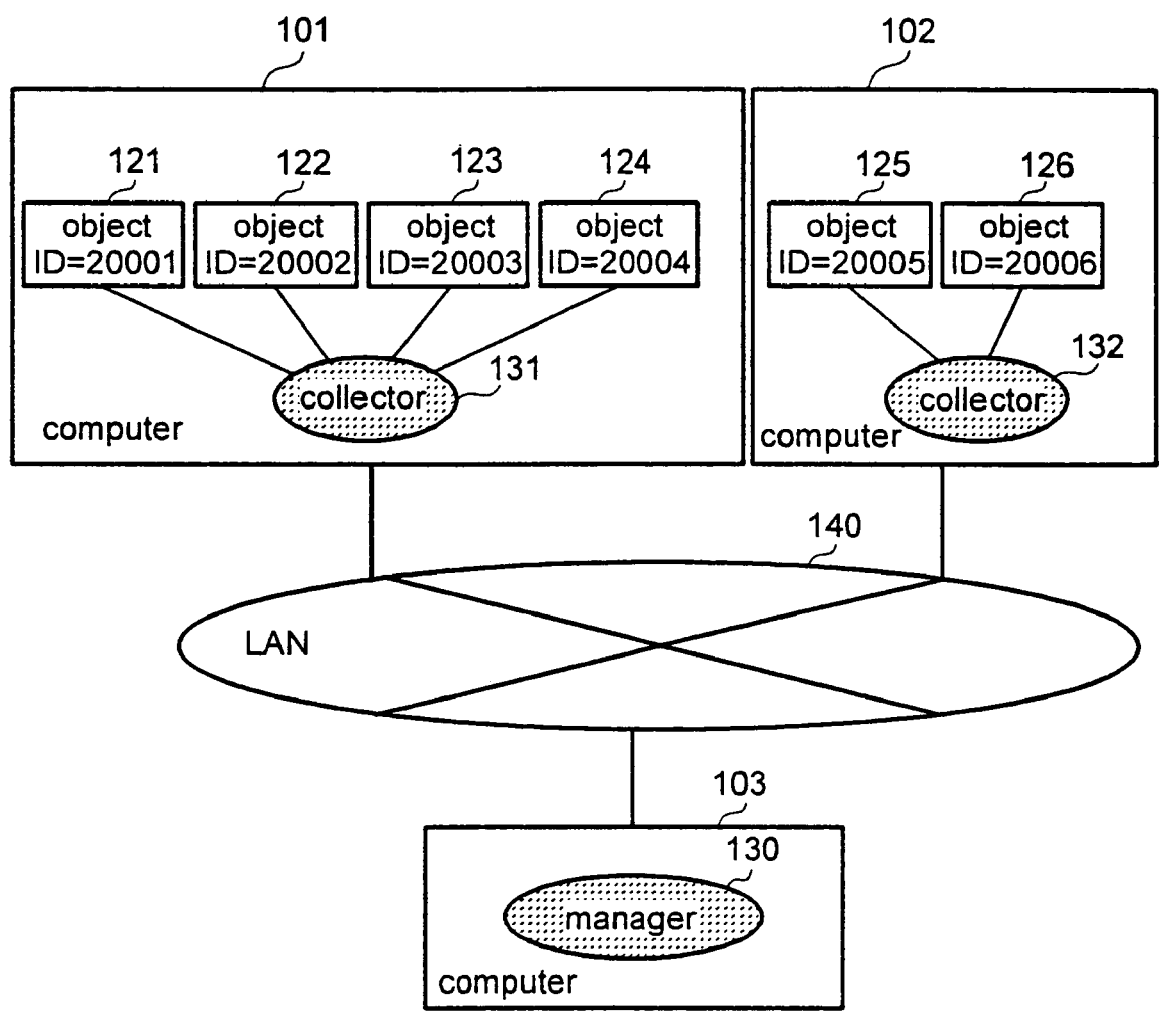
FIG. 1 is the structure figure of the computer system of an embodiment form.

FIG. 1 is a structure diagram of the computer system that realizes a performance monitoring method of this embodiment form. This computer system consists of computer 103 that executes manager 130 which is the program that processes and displays collected data related to performance, computers 101, 102 on which an object that is the target for performance monitoring is mounted, and LAN 140 to which the computers are connected. While the computer that becomes the target of monitoring in this embodiment is two units, the limitation is not in the number of units. And, each computer can communicate mutually by LAN 140, but a means of realizing communication is not limited to LAN 140. Collector 131, 132 is a program that receives instructions from manager 130, collects performance data according to a necessity and sends the collected data to the manager. Object 121-126 is program entity that actually becomes the target of monitoring. The managers differentiate those objects by using the unique ID for each object that is called object ID. As object ID, for example, an object reference used in CORBA that is one of standard of distributed object techniques is used. About the CORBA technique, it is detailed to "THE COMMON OBJECT REQUEST BROKER: ARCHITECTURE AND SPECIFICATION", OMG DOCUMENT REVISION 2.2, FEBRUARY 1998.

And, while it is not shown in FIG. 1, a display device and an input device are connected to each computer 101, 102, 103. Especially, the display device of computer 103 displays the list of object ID, the processing time of each object for a series of processing that ranges over from one object to another object, and time of communication between objects, etc. And, the input device of computer 103 is used for data input and command input for designating the object that is made the target of monitoring.

And, while manager 130 is assigned on computer 103 that is independent of computer 101, 102 in FIG. 1, the present invention can be implemented by arranging manager 130 on the same computer 101 as collector 131 like, for example, computer 101. When manager 130 is arranged on independent computer 103, the influence on performance that manager 130 gives to performance monitoring can be removed.

And, it is possible to prepare a storage medium in which manager 130 and collector 131, 132 are stored as a program. A program stored on this medium is read from a drive device connected to computer 101, 102, 103, or is sent to computer 101, 102, 103 from other computer by way of a network, and collector 131, 132 or manager 130 that is a program part arranged on each computer is loaded to a memory of the computer, and then the program can be executed by the computer.

Figure 2:
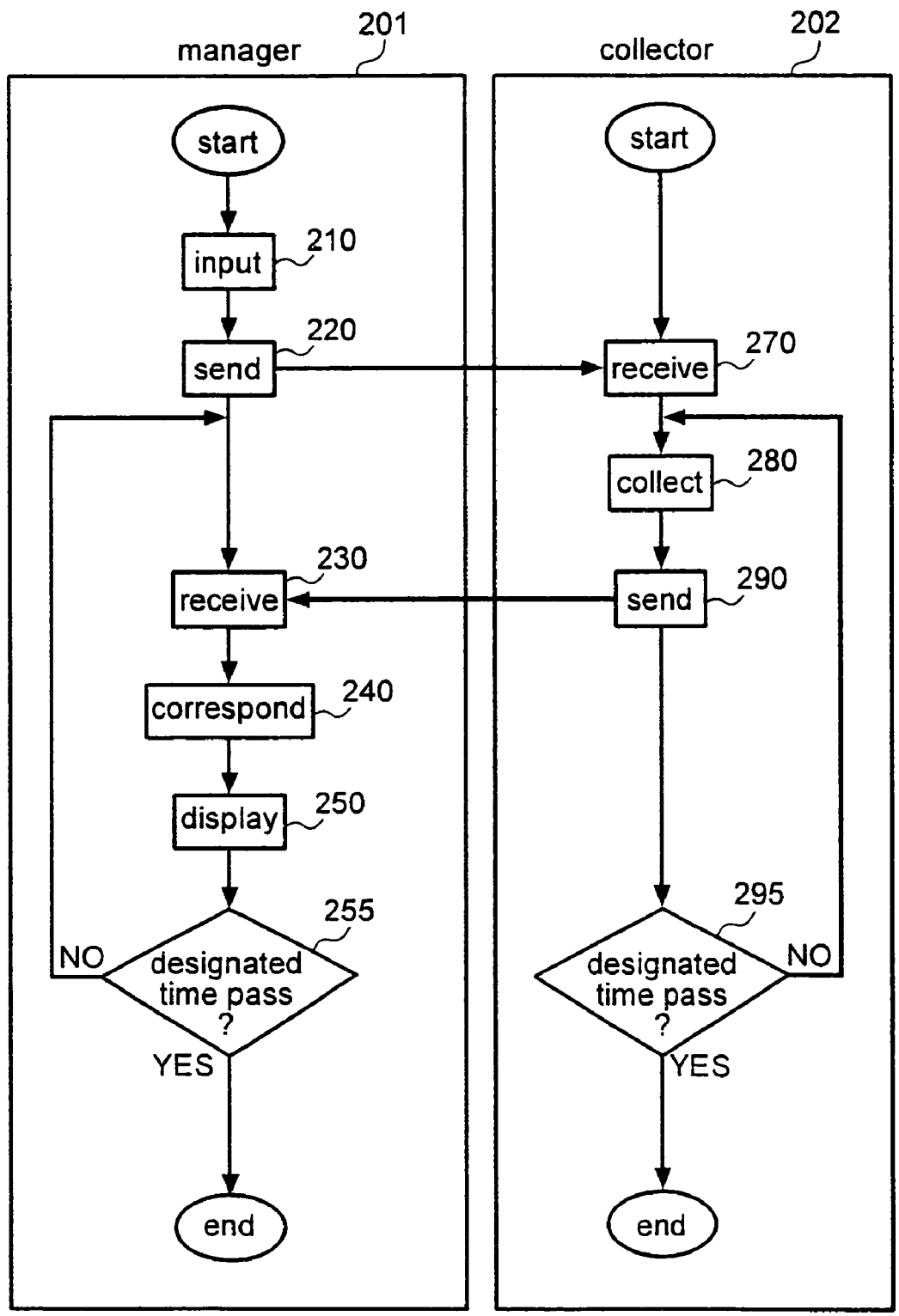
FIG. 2 is a diagram showing an outline procedure of processing of the first embodiment form.

FIG. 2 is a diagram showing an outline procedure of processing of the whole system of the first embodiment form. This processing procedure consists of two blocks of block 201 that is the charge part of manager 130 and block 202 that is the charge part of collector 131, 132.

Block 201 that manager 130 executes is explained first. First, manager 130 displays the list of objects on step 210, and receives selection input of the object that collects performance data. Next, in step 220, the object ID of the object of which performance data inputted in step 210 is collected is notified to all collectors 131, 132 by the broadcast. In step 230, manager 130 waits for an arrival of the performance data that is transmitted from collector 131, 132. When performance data is received, in step 240, association of the fragmentary performance data that is transmitted from each collector is done. Here, the association means that performance data that belongs to the same processing sequence is summarized in a group and is arranged according to a time series. The associated performance data is displayed in step 250. After the display, in step 255, the judgement of an end condition is done.

In this embodiment, any operation time is set in advance, and it is checked in step 255 whether current time has exceeded to the set time. If it has exceeded, processing is ended, but if it has not exceeded, it returns to step 230. Like this, processes of steps 230, 240 and 250 are repeatedly executed for a constant time set in advance after manager 130 first receives performance data from collector 131, 132.

Continuously, block 202 that collector 131, 132 executes is explained. In step 270, collector 131, 132 receives the data that consists of at least one object ID broadcasted by manager 130. If there is an object with the same object ID as object ID received in computer 101, 102 that the collector is executed, collector 131, 132 starts to supervise the object. As follows, this object is called as a measurement target object. Collector 131, 132 collects data concerned with performance and sends the collected data to a manager in step 290, when processing has been occurred in the measurement target object in step 280. After performance data sending, the judgement of an end condition is done in step 295. In this embodiment, the same operation time as the operation time of step 255 is set in advance, it is checked in step 295 whether current time has exceeded to the set time. If it has exceeded, processing is ended, but if it has not exceeded, it returns to step 280. Like this, processes of steps 280 and 290 are repeatedly executed for a constant time set in advance after collector 131, 132 receives object ID data from manager 130.

Figures 3, 4:
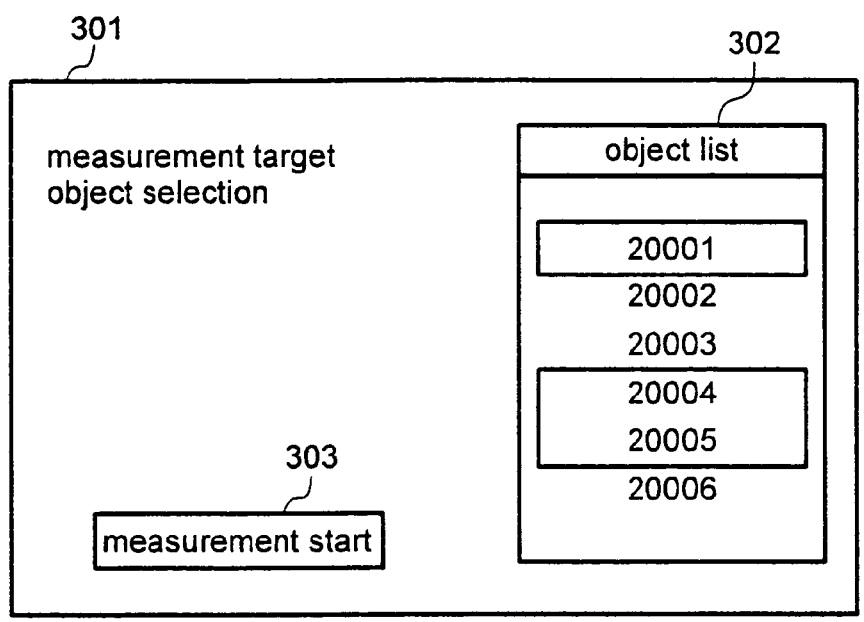
FIG. 3 is a diagram showing an example of object selection screen 301 of the first embodiment form for a measure.
FIG. 4 is a diagram showing data structure of collected data list 501 of the first embodiment form.

FIG. 3 is a diagram showing an example of measurement target object selection screen 301 that is shown on the display device of computer 103. On the object list window 302, several ID of object are displayed as target candidates which acquire performance data, and it is possible to select at least one of object as measurement target among the displayed object. In case several objects are selected simultaneously, selected several objects are ordinarily the group of the objects which are related to each other based on a communication between objects. Measurement start button 303 is a button to instruct manager 130 to start measurement after a selection of a measurement target object. When measurement start button 303 is pressed, in step 220, manager 130 broadcasts selected object ID to each collector 131, 132.

As for this example, the object ID 20001, 20002, 20003, 20004, 20005 and 20006 of the object that collectors 131 and 132 make a measurement target are displayed on the object list window 302, and it is shown that the object ID 20001, 20004 and 20005 are selected among those object ID.

FIG. 4 is a diagram showing data structure of each collected data list 501 that collector 131, 132 generates on each of the memory of computers 101, 102. The collected data list 501 consists of each field of object ID 502, the receive object ID 503, the receive message ID 504, the receive time 505, the send object ID 506, the send message ID 507 and the send time 508. Whenever a measurement target object receives a message from other objects, sends a message to other objects or sends a message after message receiving, a collected data list 501 is generated. Object ID 502 is the ID of a measurement target object. Receive object ID 503 is the ID of the other object at the time when a measurement target object receives a message. A message ID added to the receive message is stored to receive message ID 504. A message receive time is stored to receive time 505. Send object ID 506 is the ID of the other object at the time when a measurement target object sends a message. Send message ID 507 is the message ID that is added to the send message. A message send time is stored to send time 508. And, about object ID 502 that starts processing according to occurrence of events such as the data input from the user, receive object ID 503 and receive message ID 504 are not stored and processing start time is stored to receive time 505. And, about object ID 502 that ends processing by the measurement target object instead of message sending to the other object, send object ID 506 and send message ID 507 are not stored and a processing end time is stored to a send time 508. Here, as message ID, for example, message ID internally used in CORBA which is one of standard in distributed object technique.

The measurement target object notifies to the collector prepared in the computer the ID of the measurement target object and processing start time, when event such as the data input from the user occurs and processing starts. And, when a message is sent to other objects, the measurement target object notifies to the collector the ID of the measurement target object, the ID of the other object, the message ID to be sent and message send time. And, when a message is received from other objects, the collector is notified of the ID of a measurement target object, the ID of the other object, the received message ID, the message receive time and the flag that indicates whether message sending occurs continuously. And, when a series of processing is ended, a collector is notified of the ID of a measurement target object and processing end time. After a notification of a measurement target object is received from manager 130, the collector sends a command to a measurement target object, and starts a notification of the time of an object, etc.

Figure 5:
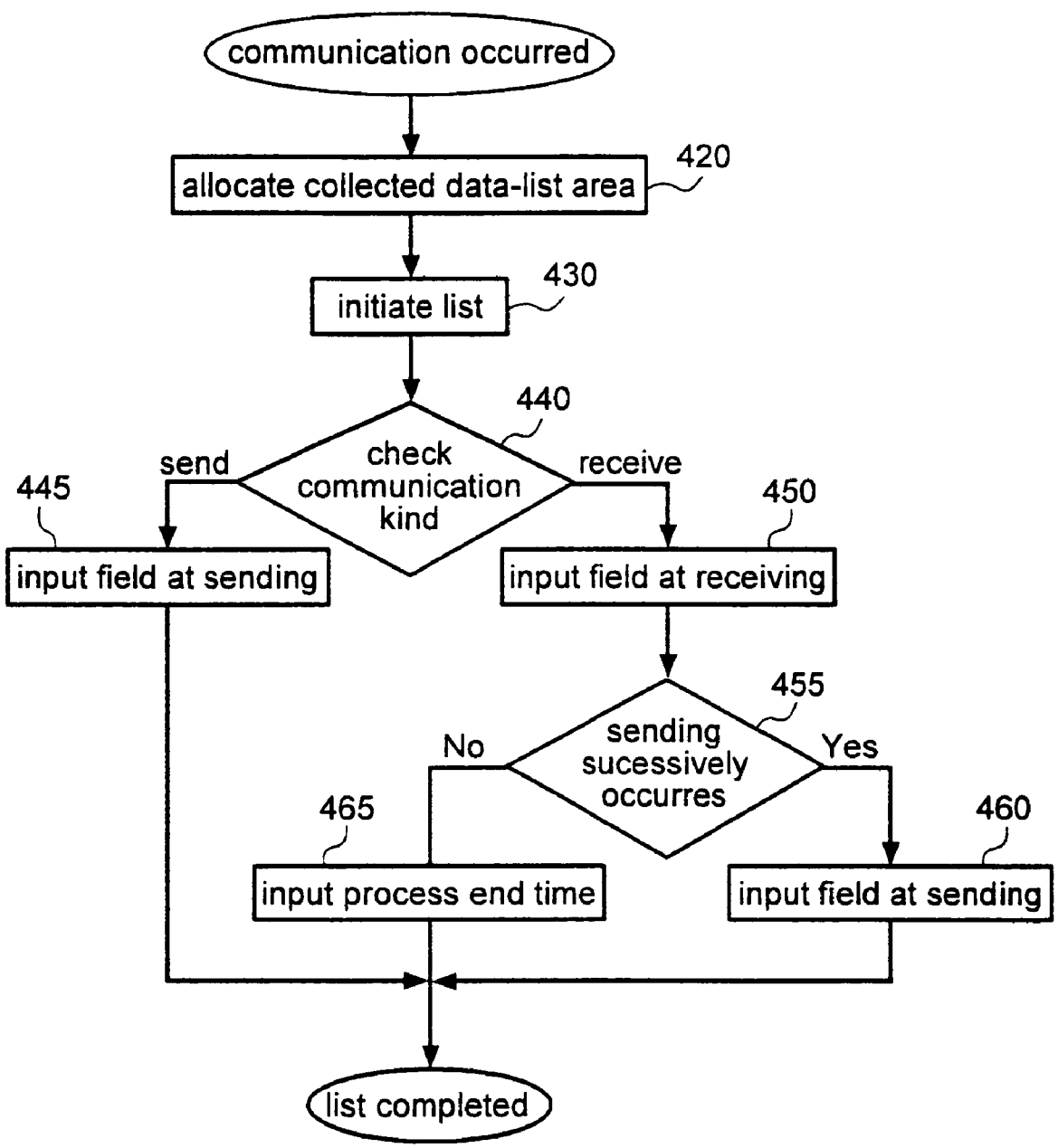
FIG. 5 is a flowchart that shows a flow of processing of collector 131, 132 of the first embodiment form.

FIG. 5 is the flowchart that shows a flow of processing of collector 131, 132 which collects performance data. When a notification is received from a measurement target object, the collectors 131, 132 allocate collected data-list 501 area (step 420), store the object ID of notified measurement target object to the object ID 502 of the collected data-list 501 area allocated, and initiate other each of fields with "−1". Next, the kind of the occurred communication is checked (step 440). When a processing start notification and a message send notification are received from a measurement target object (step 440 send), processing start time is stored to the receive time 505 in the collected data-list 501, the send object ID 506, the send message ID 507 and the send time 508 of the collected data-list are stored on the basis of information of message send notification (step 445), and then the collected data-list is completed.

When a message receive notification is received from a measurement target object (step 440 receive), the receive object ID 503, the receive message ID 504 and the receive time 505 in the collected data-list 501 are stored on the basis of information of message receive notification (step 450). Next, it is judged whether sending occurs continuously with a flag received from the measurement target object or not (step 455). In case sending occurs continuously (step 455 YES), message send notification from the same measurement target object is waited, when message send notification is received, the send object ID 506, the send message ID 507 and the send time 508 in collected data-list 501 are stored (step 460), and then collected data-list 501 is completed. In case sending does not occur continuously (step 455 NO), processing end notification from the same measurement target object is waited, when processing end notification is received, the processing end time is stored to the send time 508 in collected data-list 501 (step 465), and then collected data-list 501 is completed.

And, in case, as for the same object, the processing time from the processing start time to the message sending time or the processing time from the message receiving time to the processing end time can be neglected on performance monitoring, collection of processing start time or processing end time can be omitted. In case processing end time can be neglected, processing of step 465 is unnecessary.

Figures 6, 7:
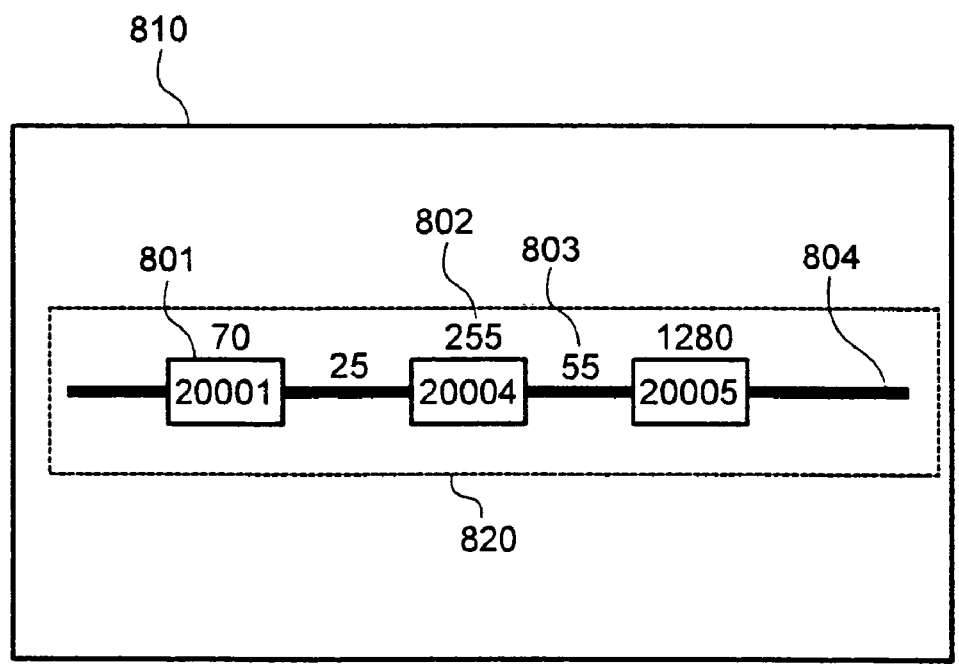
FIG. 6 is a diagram showing data structure of request flow table 701 of the first embodiment form.
FIG. 7 is a diagram showing an example of display screen 810 of a measurement result of the first embodiment form.

FIG. 6 is a diagram showing data structure of request flow table 701 that manager 130 generates on the memory of computer 103. The request flow table 701 is that, for group of measurement target object related by communication, the collected data-list 501 arrived at manager 130 is sorted according to the processed order to arrange as time-series. Each line of request flow table 701 is collected data list 501 itself. Contents of each field of the object ID 702, the receive object ID 703, the receive message ID 704, the receive time 705, the send object ID 706, the send message ID 707 and the send time 708 are the same as the object ID 502, the receive object ID 503, the receive message ID 504, the receive time 505, the send object ID 506, the send message ID 507 and the send time 508 respectively. For each line of request flow table 701, the difference of send time 708 and receive time 705 is the processing time (a process passage time including latency in the same computer) of the measurement target object. In case object ID stored to the send object ID 706 in a line is object ID 702 in the next line, object ID stored to receive object ID 703 in the next line is object ID 702 in a line, and send message ID and receive message ID are coincident to each other, it is showing that communication between both of measurement target objects has been executed in processing flow for the same transaction, and the difference of send time 708 in a line and receive time 705 in the next line is communication time between both objects.

FIG. 7 is a diagram showing an example of measurement result display screen 810 displayed on the display device of computer 103. Measurement result display screen 810 displays processing flow 820 in which request flow table 701 is shown as a diagram. Processing flow 820 is that object ID 801 of which process is executed is arranged according to the processed order as time-series, and the front and the back of object ID 801 were joined by line segment 804. Processing flow 820 is composed of the set of object ID 801, value 802 showing processing time thereof, and value 803 showing communication time between objects, and line segment 804 for connecting each objects. Each object ID 801 is equivalent to each object ID 702 of request flow table 701.

Figure 8:
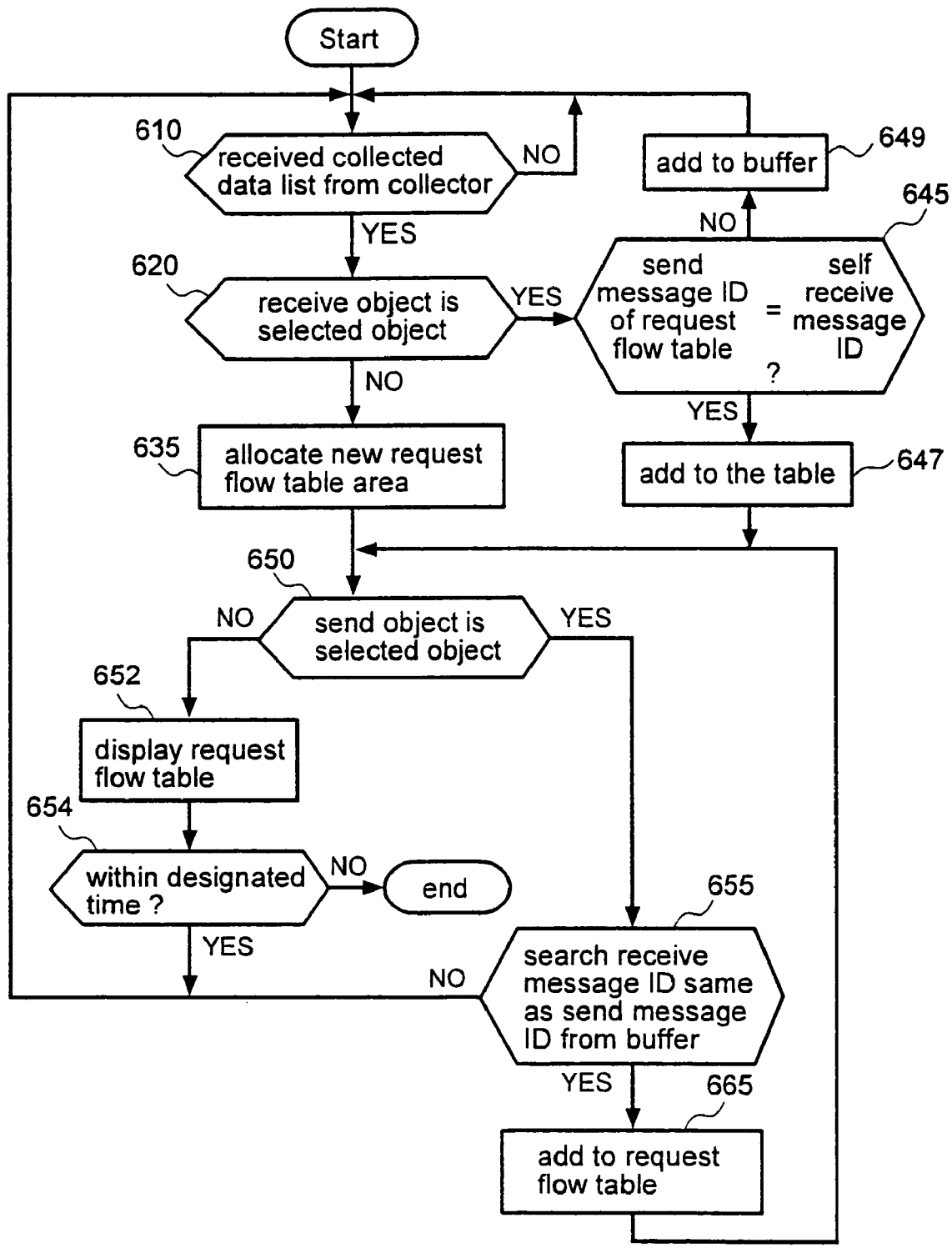
FIG. 8 is a flowchart that shows a procedure for processing of manager 130 of the first embodiment form.

FIG. 8 is a flowchart that shows a flow of processing of manager 130 which generates and displays request flow table 701. Manager 130 waits for arrival of collected data-list 501 from collector 131, 132 (step 610). When collected data-list 510 is arrived, receive object ID 503 thereof is checked, it is judged whether this ID is coincident to which of the ID of the selected measurement target object or not (step 620). In case the ID is not coincident (step 620 NO), area of request flow table 701 is newly allocated on the memory of computer 103, and collected data-list 501 which is arrived is set as top element thereof (step 635). And, this request flow table 701 that is not completed is called as a request flow table during generation hereafter. For execution of process shown in FIG. 8, several request flow tables during generation are generated.

In case the ID is coincident (step 620 Yes), request flow tables during generation is searched, it is checked whether or not there is table in which the send message ID in the collected data-list consisting of end of table and the receive message ID in the collected data-list get at that time are coincident to each other (step 645). As it is checked, if there is the coincident table (step 645 YES), a collected data-list got at that time is added to the last tail of the relevant request flow table during generation (step 647). And, if there is not the coincident table (step 645 NO), the collected data-list is kept in a collected data-list buffer that is a temporary preservation area on the memory (step 649), and it waits for an arrival of a new collected data-list after returns to step 610.

In step 650 continued by step 635 and step 647, the send object ID 706 in the collected data-list added to the last tail of request flow table during generation is checked (step 650). Because this request flow table is completed in this step, if the checked ID is not the ID of a measurement target object (step 650 NO), this request flow table is displayed (step 652). After a display, it is checked whether the time has not been exceeded to the time set in advance (step 654). It waits for an arrival of a new collected data-list after returns to step 610 if it has not been exceeded (step 654 YES). If it has been exceeded (step 654 NO), processing of manager 130 is ended.

As it is checked in step 650, in case the send object is the ID of selected measurement target object (step 650 YES), collected data-list having the same receive message ID as send message ID 707 is searched from collected data-list buffer (step 655). If a collected data-list is found (step 655 YES), the collected data-list is added to the last tail of a request flow table during generation that was treated as target in step 635 or 647, and then it returns to step 650. If a collected data-list is not found (step 655 NO), after returns to step 610, it waits for an arrival of a new collected data-list.

According to a procedure for processing of manager 130 which is shown in FIG. 8, even if collected data-list 501 that belongs to several transactions is mixed and arrives at manager 130, and the sequence of processing of each object and the arrival sequence of collected data-list 501 are different to each other, request flow table 701 is generated for each transaction, and the collected data-list that constitutes request flow table 701 is arranged to the time series according to the sequence of processing. The collected data-list that is arrived earlier than the point of time to be stored in a request flow table is kept in a collected data-list buffer in step 649 and is stored in the same table in step 665 when it becomes the point of time to be stored.

In the first embodiment, a constant operation time is set in advance, and for this time, performance data collection processing of manager 130 and collector 131, 132 is executed repeatedly, but, by adding to manager 130 a function of receiving the end instruction from the user, processing can be executed at any time. The change point about a flowchart shown in FIG. 2 that is necessary to do this processing is the following. The change points of manager 130 are two points that end judgement step 255 is changed to "Is there the end instructions from user?", and if there is end instruction, end instruction is sent to a collector before ending. The change point of collector 131, 132 is that step 295 is changed to "Is there end instruction from manager?".

According to the first embodiment fore explained, it is possible to collect the processing time that is concerned with a selected measurement target. And, in case process is executed over several measurement target objects selected, those process are displayed as a processing flow 820, and it is able to display processing time for each object and communication time between objects.

(2) Second Embodiment Form

In the first embodiment form, an user has a trouble that all objects that participate in the processing flow must be designated as a measurement target object in order to acquire processing flow. In the second embodiment form, an user can get processing flow about a series of processing of back from the processing that the object executes by designating a object. To realize this function, collector 131, 132 generates a request flow table. That is, a request flow table is added to a message transmitting between objects, whenever processing is executed in each object, a collected data-list is added to a request flow table. The structure and operation in the second embodiment form are explained about the distributed object environment that is shown in FIG. 1 below.

Figure 9:
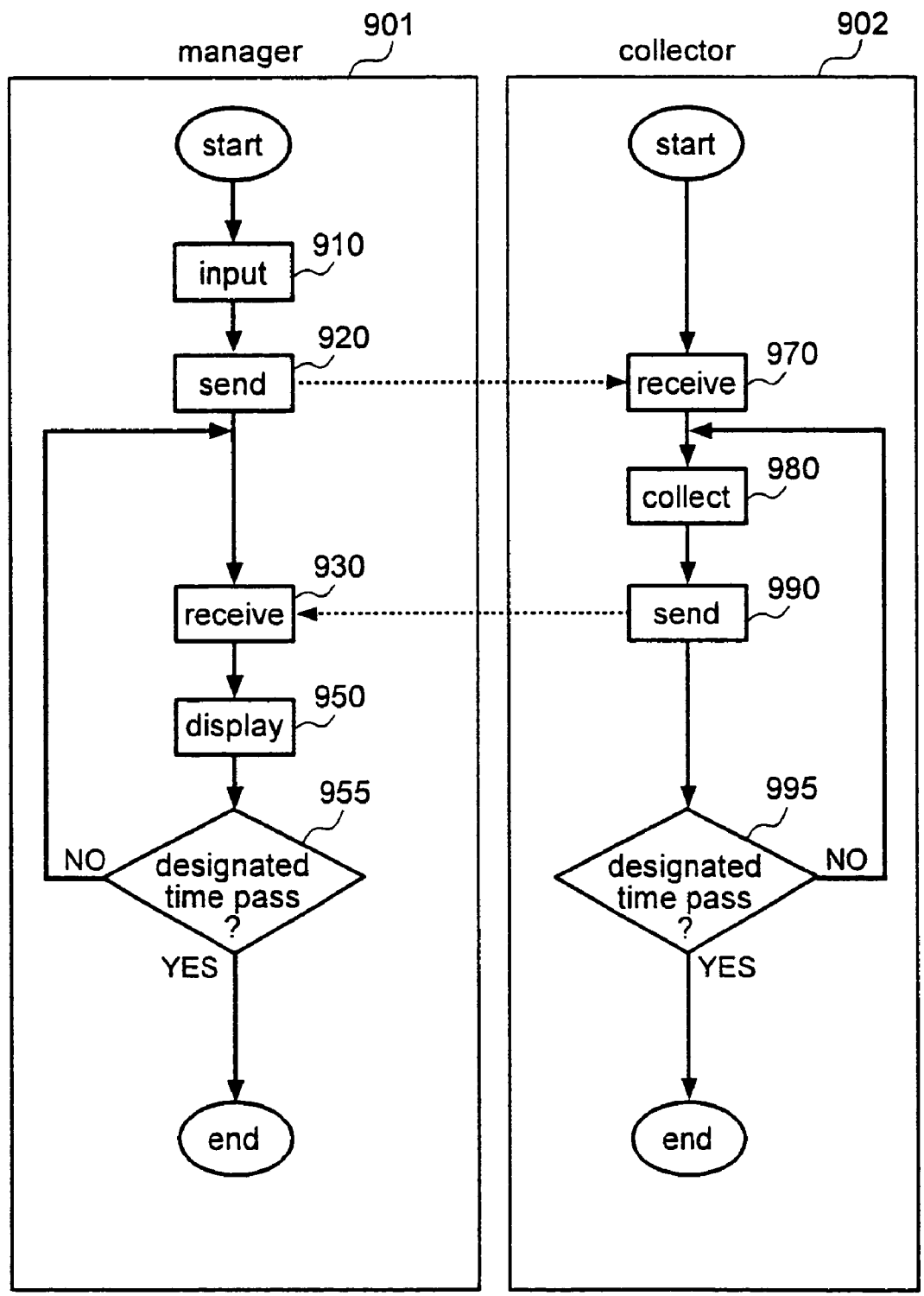
FIG. 9 is a diagram showing an outline procedure of processing of the second embodiment form.

FIG. 9 is the flow chart that shows the outline procedure of processing of the whole system of the second embodiment form. This processing procedure consists of two blocks of block 901 that is the charge part of manager 130 and block 902 that is the charge part of collector 131, 132.

Block 901 that manager 130 executes is explained first. Manager 130 first receives selection input of the object that executes processing at the beginning of processing flow in step 910. This input method is the same as a method explained in the first embodiment form. However, the number of the objects that are designated is limited to one. Next, in step 920, all collectors 131, 132 are notified of the object. ID of the object that collects performance data inputted in step 910 in step 920, by using the broadcast. In step 930, manager 130 waits for an arrival of the data that is sent from collector 131, 132. When performance data is received, processing flow is displayed in step 950. After a display, the judgement of a condition to end is executed in step 955. In this embodiment form, any operation time is set in advance, it is checked in step 955 whether the time has not been exceeded to the set time. While processing is ended, if it has been exceeded, if it has not been exceeded, it returns to step 930. Like this, processing of steps 930 and 950 are repeatedly executed for a constant time set in advance after manager 130 first receives performance data from collector 131, 132.

Next, block 902 that collector 131, 132 executes is explained. Collector 131, 132 receives object ID broadcasted by manager 130 in step 970. Collector 131, 132 starts supervision of an object executed in computer 101, 102 that the collector is executed. When processing occurs in the object in step 980, collector 131, 132 collects processing start time or message receive time, and message send time or processing end time according to a necessity, and generates processing flow data from collected data. Next, processing flow data generated in step 990 is sent to a manager. After performance data is sent, the judgement of a condition to end is executed in step 995. In this embodiment form, the same operation time as the operation time of step 995 is set in advance, and it is checked whether it has not been exceeded to the time set in step 995. While processing is ended, if it has been exceeded, if it has not been exceeded, it returns to step 980. Like this, processing of steps 980 and 990 are repeatedly executed for a constant time set in advance after collector 131, 132 receives performance data from manager 130.

FIG. 10 is a diagram showing data structure of collected data-list 1101 that is used in the second embodiment form. Collected data-list 1101 is composed of each field of object ID 1110, receive time 1120 and send time 1130. Object ID 1110 is the ID of either the object designated by a user or any object that constitutes processing flow. Receive time 1120 is the processing start time or the message receive time about the object. Send time 1130 is the message send time or the processing end time about the object.

FIG. 11 is a diagram showing data structure of request flow table 1201 that is used in the second embodiment form. Request flow table 1201 is the table that collected data-list 1101 is arranged to the time series according to the executed order of processing. A request flow table 1201 is generated for each processing flow.

Each object notifies the ID of the object and processing start time to collector prepared in the computer at the time when event as data input etc. is occurred and processing starts. And, each object notifies the ID of the object and the time when message sending occurs to the collector at the time when a message is sent to other objects. Request flow table 1201 is received from collector, and message to the other objects to which the received request flow table 1201 is added is sent. And, if the ID of the object and request flow table 1201 are received at the time when a message or a message and request flow table 1201 are received from the other object, the collector is notified of the request flow table 1201, the message receiving time and the flag indicating whether message sending occurs continuously. And, when a series of processing is ended, a collector is notified of the ID of the object and processing end time.

Collector 131, 132 displays a measurement target object selection screen 301 and receives an input of object ID, likewise with the first embodiment form, in processing of step 910, that is, process of receiving an input of an object selection from an user. However, in the second embodiment form, only one of the object ID displayed on object list window 302 can be selected. When measurement start button 303 is pressed after selecting object ID, manager 130 broadcasts the selected object ID to each collector 131, 132.

Figure 12:
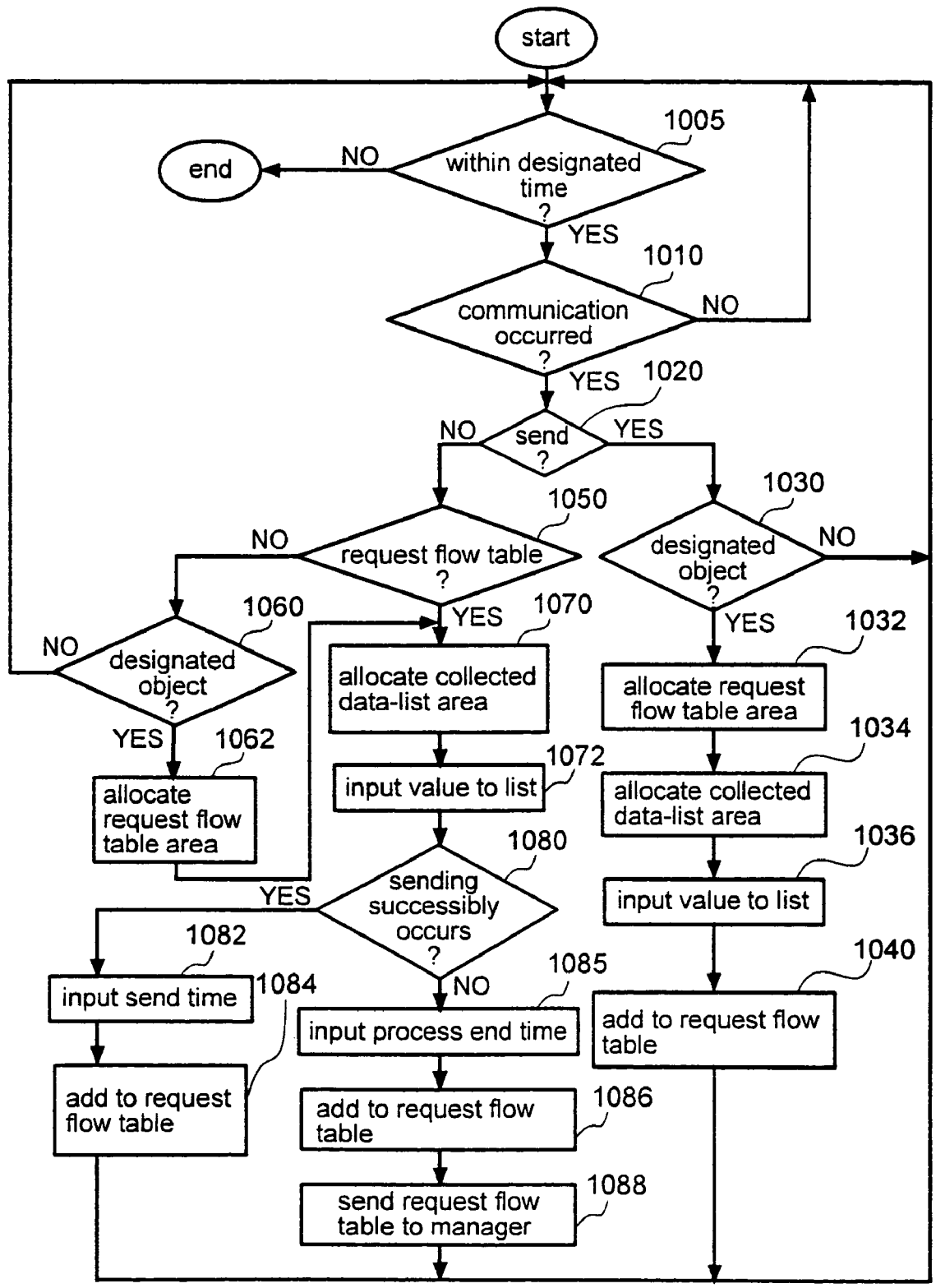
FIG. 12 is a flowchart that shows a flow of processing of collector 131, 132 of the second embodiment form.

FIG. 12 is a flowchart that shows a flow of processing of collector 131, 132 which collects performance data and generates request flow table 1201. First, collector 131, 132 checks whether it has not been exceeded to the time set in advance (step 1005). If it has been exceeded, processing of collector 131, 132 is ended. It waits for an occurrence of communication for all objects executed on the computer if it has not been exceeded (step 1010).

When a message send notification or a processing start notification and a message send notification was received from either object (step 1020 YES), it is checked whether the object that executes sending is the selected (designated) object (step 1030). It returns to step 1005 so that it is not necessary to collect performance data if it is not the designated object (step 1030 NO). If it is the designated object, an area for request flow table 1201 is allocated on the memory (step 1032). Next, the area of collected data-list 1101 is allocated on the memory (step 1034), and object ID 1110, receive time 1120 and send time 1130 are stored to this list (step 1036). The object ID of the relevant object is stored to the object ID 1110, the processing start time is stored to the receive time 1120, and the time when sending occurs is stored to the send time. Next, the generated collected data-list 1101 is added to the last end of request flow table 1201 and is sent to the relevant object (step 1040).

On the other hand, when message receive notification is received from object (step 1020 NO), it is checked whether request flow table 1201 is added to the notification (step 1050). It is checked whether the object is the designated object (step 1060), if request flow table 1201 is not added (step 1050 NO). If it is not the designated object (step 1060 NO), it returns to step 1005 so that it is not necessary to collect performance data. If it is the designated object, an area for request flow table 1201 is allocated on the memory (step 1062), and it returns to step 1070.

When request flow table 1201 has been added to a message receive notification (step 1050 YES), an area of collected data-list 1101 is allocated on the memory (step 1070), and object ID 1110 and the receive time 1120 are stored to the list (step 1072). The object ID of the relevant object is stored to object ID 1110, and the message receive time is stored to the receive time 1120.

Next, it is judged whether sending occurs continuously, on the basis of a flag received from the relevant object (step 1080). In case sending occurs continuously (step 1080 YES), it waits for the message sending notification from the same object, and if message send notification is received, the time when sending is occurred is stored to the send time 1130 of collected data-list 1101 being generated (step 1082). Next, the generated collected data-list 1101 is added to the last end of request flow table 1201 that had been already received from the relevant object or had been newly generated, and it is sent to the relevant object (step 1084).

In case sending does not occur continuously (step 1080 NO), it waits for the processing end notification from the same object, and the processing end time is stored to the send time 1130 of the collected data-list 1101 that is being generated when a processing end notification is received (step 1085). Next, generated collected data-list 1101 is added to the last end of request flow table 1201 that had been already received from the relevant object or had been newly generated (step 1086), and completed request flow table 1201 is sent to manager 130 (step 1088), and it returns to step 1005.

Next, a display of the processing flow executed in step 950 is explained. Here, processing flow 820 is displayed on measurement result display screen 810 likewise with the first embodiment form. Object ID 801 is object ID 1110 itself of collected data-list 1101 that constitutes each line of request flow table 1201, processing time 802 of object execution is determined by taking a difference of the receive time 1120 and the send time 1130 of the collected data-list 1101 that constitutes each line of request flow table 1201, and communication time 803 is determined by taking a difference of the send time and the receive time of two serial collected data-lists 1101 that constitute request flow table 1201.

According to the second implementation form fore explained, by designating an object, an user can get the back processing flow from the processing of the object. That is, for example, even if it is not understood which server object is accessed by a client object, only with designating the client object, the processing flow of a series of processing that begins by the request from the client can be got. And, like the first embodiment form, it is possible to extract processing flow processed by a specific object.

(3) Third Embodiment Form

In the first and second embodiment form, an input of the measurement target object or the object that executes the first processing is received, and the processing flow concerned with the designated object or the processing flow that makes a designated object the head of processing was acquired. In the third embodiment form, an input of a target computer identifier is received, and when a target computer identifier is inputted, acquisition of the point data of all objects that are executed in the designated computer is enabled. And, a function by which a process of collecting the performance data of the second embodiment form and a process of collecting point data are automatically changed according to a status is provided.

Figure 13:
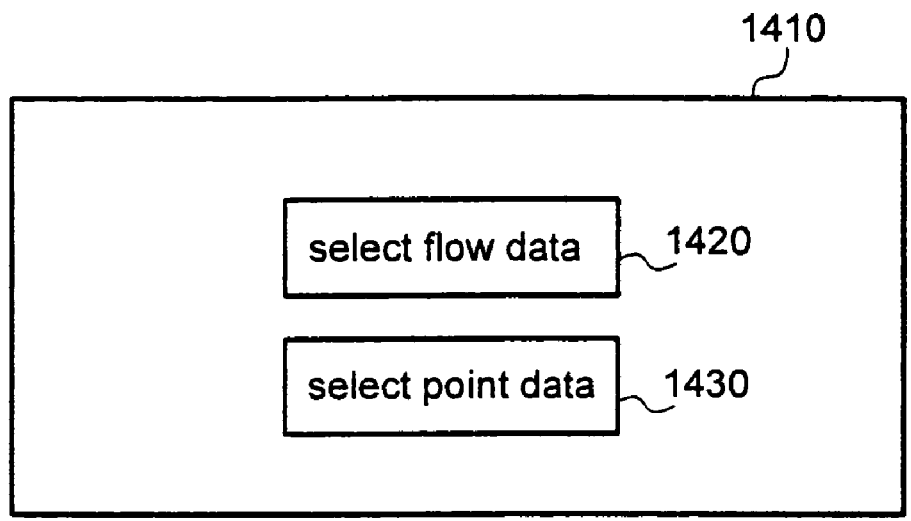
FIG. 13 is a diagram showing an example of selection screen 1410 of the third embodiment form.

FIG. 13 is a diagram showing an example of selection screen 1410 of the data collection object that is shown on the display of computer 103. Selection screen 1410 displays flow data selection button 1420 and point data selection button 1430. Flow data selection button 1420 is the button that is pressed when selecting flow data as a collection target. The flow data, as explained in the first embodiment form, is that the time of processing of each object that constitutes a flow of processing when a series of processing is executed over several objects and the time of communication between objects are collected. Point data selection button 1430 is the button that is pressed when selecting point data as a collection target. Point data is that the times of processing of all objects that are executed on the computer that pay an attention to a certain computer are collected.

Figure 14:
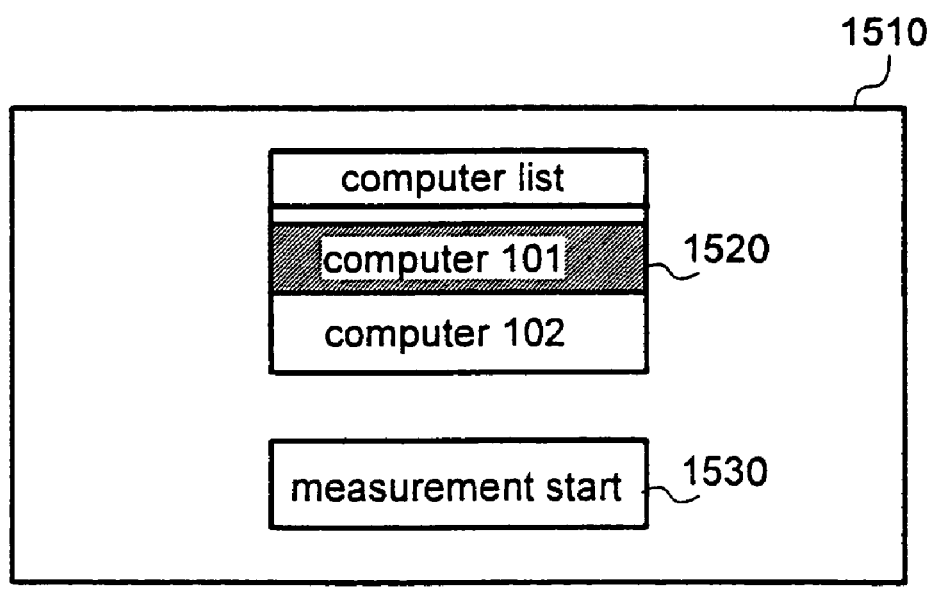
FIG. 14 is a diagram showing an example of measurement target computer selection screen 1510 of the third embodiment form.

FIG. 14 is a diagram showing an example of measurement target computer selection screen 1510 that is shown on the display device of computer 103. Measurement target computer selection screen 1510 displays computer list window 1520 and measurement start button 1530. Computer list window 1520 displays the list of all computers connected on LAN 140. Measurement start button 1530 is a button to instruct a start of a measurement after designating a computer.

FIG. 15 is a diagram showing data structure of threshold table 1610 that is set on the memory of computer 103. "The object ID" is the ID of each object and "the processing time" is the upper limit of the time that is necessary to the processing in the object. "The processing time" is the processing passage time that also includes the latency that occurs on the computer that executes the processing. "The latency" is latency that until a result is received, after the object requests processing to object of other computer.

FIG. 16 is a diagram showing an example of a result display screen of a collection of the point data that is displayed on the display device of computer 103. The identifier of a measurement target computer, the ID of an object executed on the computer and the processing time are displayed on the screen. Idle is latency which is caused by requesting processing to object of the other computer from the upper object.

Figure 17:
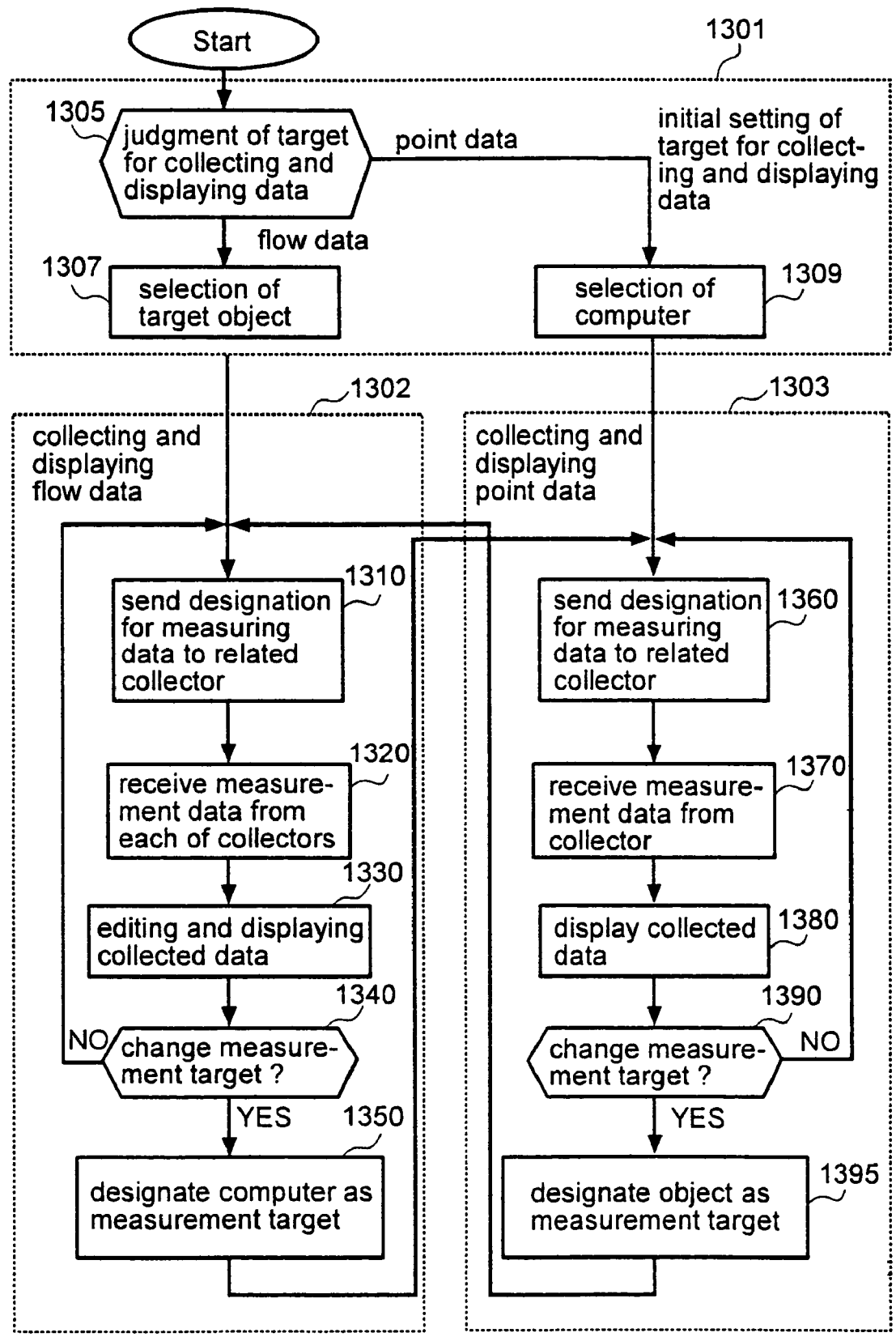
FIG. 17 is a flowchart that shows a procedure for processing of manager 130 of the third embodiment form.

FIG. 17 is the flowchart that shows a flow of processing of manager 130 for the third embodiment form. The flowchart is greatly composed of three blocks, that is, block 1301 that initializes target of collecting and displaying data, block 1302 that collects and displays flow data, and block 1303 that collects and displays point data.

Manager 130 first displays selection screen 1410, and on the basis of the input information, judges whether the target of a data collection is flow data or point data (step 1305). In case flow data is selected, measurement target selection screen 301 is displayed, and designation of a target object in which top of the processing flow is positioned is received (step 1307). Then, when measurement start button 303 is pressed, it advances to step 1310. On the other hand, in case point data is selected, measurement target computer selection screen 1510 is displayed, and designation of a measurement target computer is received (step 1309). And, when a computer is designated and measurement start button 1530 is pressed, it advances to step 1360.

In case of a collection and displaying of flow data, it is first notified of the ID of an object designated to each collector, and a measurement of data is instructed (step 1310). Next, request flow table 1201 is received from each collector (step 1320), the collected data is edited, and processing flow is displayed (step 1330). Processing of above steps 1310 1330 is the same as processing of manager 130 and collector 131, 132 of the second embodiment form.

And, it is judged whether a change of a measure object by referring threshold table 1610 on the memory is necessary (step 1340). Manager 130 compares the processing time including the latency of processing in the computer measured and the processing time of the object that corresponds on threshold table 1610 for each object that constitutes processing flow. And, if there is not the object that has measure time over threshold of processing time (step 1340 NO), it is judged that change is unnecessary, it returns to step 1310, and processing of collecting and displaying flow data is continued for the object that constitutes the same processing flow. On the other hand, in case the object that has measurement time over threshold exists (step 1340 YES), it is judged that a change is necessary, a corresponding object is selected, and the computer that the object was executed is set as a measurement target (step 1350). Manager 130 inquires to each collector 131, 132 by designating the ID of the object, and obtains a reply of the identifier of a computer that the collector that supervises the object was executed. And, it advances to step 1360, and it is changed into processing of a collection and a display of point data.

In case of a collection and a display of point data, manager 130 first instructs a measurement of data for processing of all objects that are executed on the relevant computer to the collector which corresponds to a designated computer (step 1360). The collector which received the instructions receives a notification of processing start time, message receive time, message send time and processing end time from the object that is made a measurement target. And, for a target object, collected data-list 501 is generated, collected data-list 501 is arranged to the time series for each processing flow, and a request flow table is generated. Next, the processing time and the latency of each target object are calculated from this request flow table. The processing time is the difference of processing start time and message send time, the difference of message receive time and message send time, or the difference of message receive time and processing end time. The latency is the difference of the send time when a message is sent to the object of other computer and the receive time when a message is received from the same object of other computer. Next, the collector sends the processing time and the latency of each target object to manager 130. And, the collector measures data in an interval until passage of time decided in advance after receiving instructions of a data measurement, and sends these data to manager 130 together. Manager 130 receives measurement data from the collector (step 1370), and displays collected point data (step 1380).

Next, it is judged whether a change of a measure object by referring threshold table 1610 on the memory is necessary (step 1390). Manager 130 compares the latency measured for each measurement target object and the latency of the object that corresponds on threshold table 1610. If an object with latency over threshold in latency does not exist (step 1390 NO), it is judged that a change is unnecessary, it returns to step 1360, and processing of a collection and a display of point data is continued for a measurement target computer that was designated. On the other hand, in case an object with latency over threshold in latency exists (step 1390 YES), a relevant object is selected, it returns to step 1310 by setting the object as a measurement target, and it is changed to a processing of collecting and displaying flow data.

According to the third embodiment form, when the object of which the processing time that exceeds the upper limit set value of processing time is measured is detected in collecting flow data, the cause of too much processing time can be pursued by collecting the processing time of the other objects that are executed on a computer in which the object is executed. And, when the object of which the latency that exceeds the upper limit set value of latency is measured is detected in collecting point data, the cause of too much latency can be pursued by collecting flow data for the processing flow that makes processing of the object the head. Like this, by collecting performance data with changing from a flow data collection into a point data collection, and changing from a point data collection into a flow data collection, it can be detected whether the bottleneck of performance exists in which object on which processing flow, or in which object executed on which computer. On this occasion, a change between a flow data collection and a point data collection can be executed automatically.

(4) Fourth Embodiment Form

In case many objects operate on several computers, it is difficult to grasp which object operates with a relationship to which object, and to which processing flow transactions are concentrated. The fourth embodiment form is that the above problem is solved by acquiring call relation and call times between objects, and thereby a performance monitoring is supported.

The feature of the fourth embodiment form is explained by using the outline processing procedure of FIG. 2 in the distributed object environment that is shown in FIG. 1 below. First, manager 130 displays the list of an object in step 210, and selection and input of the object that collects object correlation data is received. It is possible to select all objects on a list of objects. Next, all collectors 131, 132 are notified of the object ID of the object that collects object correlation data inputted into the following in step 220, by a broadcast. Manager 130 waits for an arrival of collected data list 501 sent from collector 131, 132, in step 230. When collected data list 501 is received, a calling table 2001 mentioned in the latter part is generated from collected data list 501 in step 240, and an object correlation figure 1802 mentioned in the latter part is generated from this calling table 2001 and displayed in step 250. The end condition whether the designated time has been passed is judged in step 255 after a display is done, and if designated time has not passed, it returns to step 230, and the above processing is repeated.

On the other hand, processing of block 202 executed by collector 131, 132 is quite the same as a thing explained in the first embodiment form.

Figures 18, 19:
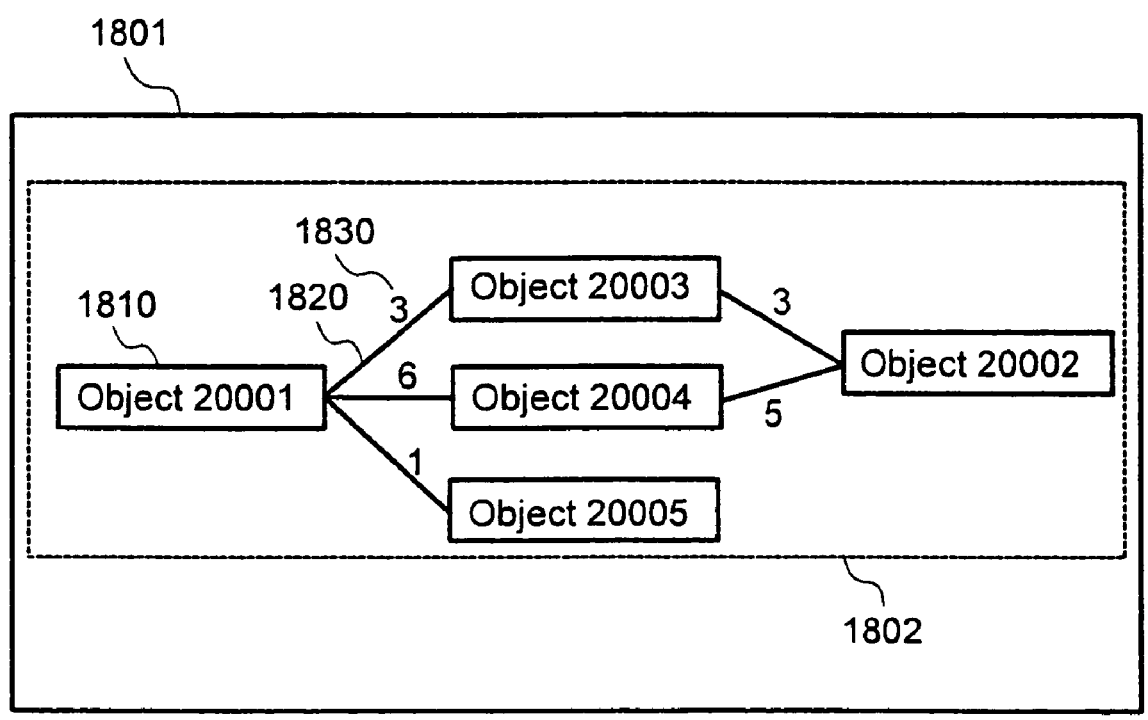
FIG. 18 is a diagram showing data structure of call table 2001 of the fourth embodiment form.
FIG. 19 is a diagram showing an example of object correlation figure display screen 1801 of the fourth embodiment form.

FIG. 18 is a diagram showing data structure of calling table 2001. A calling origin 2010 is the ID of the object that sent a request, a called destination 2020 is the ID of the object that received the request, and a calling times 2030 is a frequency that a request is sent, that is, a frequency that object of the called destination 2020 was called.

FIG. 19 is a diagram showing an example of object correlation figure display screen 1801. Object correlation figure display screen 1801 displays object correlation figure 1802. 1810 is an object ID display part, 1820 is a line segment with which related objects are connected, and 1830 is a calling times to which the object that is positioned in the right side of line segment 1820 was called. Object correlation figure 1802 of FIG. 19 shows a diagram of calling table 2001 that shows an example in FIG. 18.

Figure 20:
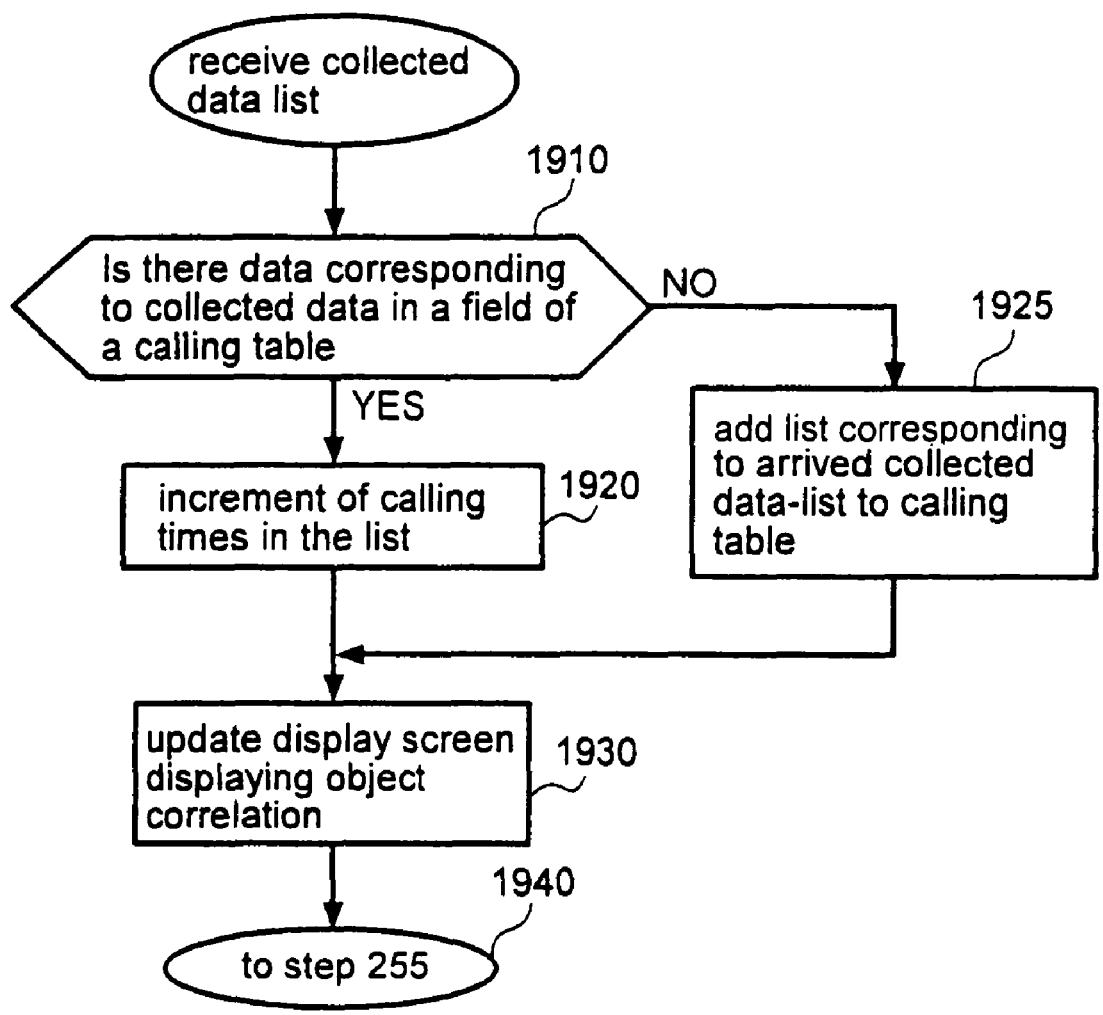
FIG. 20 is a flowchart that shows a flow of processing of the main part of the fourth embodiment form.

FIG. 20 is the flowchart that shows a flow of processing of above step 240 and step 250. When the collected data list 501 is arrived from collector, first, it is checked whether there is in a calling table 2001 a line that the calling origin 2010 is coincident with the receive object ID 503 of received collected data list 501 and the called destination 2020 is coincident with the object ID 502 of the collected data list 501 (step 1910). In this case, the object shown in object ID 502 is the object designated as a measurement target. If there is a correspondence thing (step 1910 YES), one is added to calling times 2030 of the line of the calling table including correspondence thing (step 1920). If there is not a correspondence thing (step 1910 NO), a line in which calling origin 2010 is the receive object ID 503 of the collected data list 501, called destination 2020 is the object ID 502 of the collected data list, and calling times is one is added to the calling table 2001 (step 1925).

After updating calling table 2001 by processing above step 1920 or 1925, a display of object correlation figure 1802 on object relationship figure display screen 1801 is updated on the basis of latest calling table 2001 (step 1930).

And, it can be considered that calling origin 2010 is coincident with object ID 502 of the collected data list 501, and called destination 2020 is coincident with the send object ID 506 of the collected data list 501. In this case, object shown in the object ID 502 is the object designated as a measurement target object.

By the fore mentioned fourth embodiment form, it can be that the collected data list 501 for designated object is collected, in case execution of a series of processing over the other object from an object, a relationship of calling origin/called destination between these objects is shown, and object correlation figure 1802 showing occurrence times of request between objects is displayed.

According to the present invention, performance monitoring of the whole distributed processing system as target can be executed, because the processing time of each object and communication time between objects can be acquired for the processing flow in which a processing is completed after going by way of processing of several objects through communication between objects. And, there is an effect that analysis of the bottleneck of performance is facilitated because performance monitoring for processing flow and performance monitoring for a specific computer can be dynamically changed.

The invention claimed is:

1. A performance monitoring method of a distributed processing system in which a plurality of program entities in a group of processing are distributed and arranged on several computers, the program entities executing processing by communicating with other program entities, the performance monitoring method which has a scheme for obtaining information about program entities on its infrastructure comprising the steps:

collecting, from one of the program entities, data related to a calling message received from another one of the program entities along with an identifier of the another program entity which is a source of the calling message;

performing the step of collecting for each of the plurality of program entities in the group of processing;

associating the plurality of program entities according to called program entities and calling program entities on the basis of the data collected from each of the plurality of program entities;
determining the number of calling times between the calling program entities and the called program entities on the basis of the data collected from each of the plurality of program entities;
   displaying the program entities by associating the calling program entities and the called program entities and illustrating the number of calling times between the calling program entities and called program entities;
   further collecting, from one of the program entities, performance data including relation information to another of the program entities in the processing group and at least one of a receive time of message from the another of the program entities and a send time of message to the another of the program entities for one of the program entities;
associating the performance data between the plurality of program entities on the basis of the relation information;
calculating a processing time of each of the plurality of program entities and a communication time between the plurality of program entities on the basis of the associated performance data; and
displaying the calculated processing time of each of the plurality of program entities and the calculated communication time between associated program entities in a time series manner according to an order of processing.

2. The performance monitoring method according to claim 1, further comprising a step of:
   storing in a calling table the number of times a calling program entity calls a called program entity along with identifiers of each of the program entities.

3. The performance monitoring system method according to claim 2, further comprising the steps of:
   upon determining an identifier of a particular program entity in data collected in the step of collecting data, referring to the calling table to determine whether there the particular program entity is listed in the calling table,
   updating the table if there is no identifier corresponding to the particular program entity,
   updating association of program entities, and
   displaying the program entities with interconnecting line segments indicating the association on the basis of the updated association.

4. The performance monitoring system method according to claim 2,
   referring to the calling table to determining whether there is an identifier of program entity in the calling table corresponding to an identifier in the collected data,
   increasing the number of calling times corresponding to the identifier in the calling table if there is an identifier corresponding to the identifier, and
   displaying the program entities with updated number of calling times for the program entities.

* * * * *